May 16, 1967 M. J. TERHO 3,319,810
REFUSE VEHICLE
Filed April 8, 1965 4 Sheets-Sheet 3
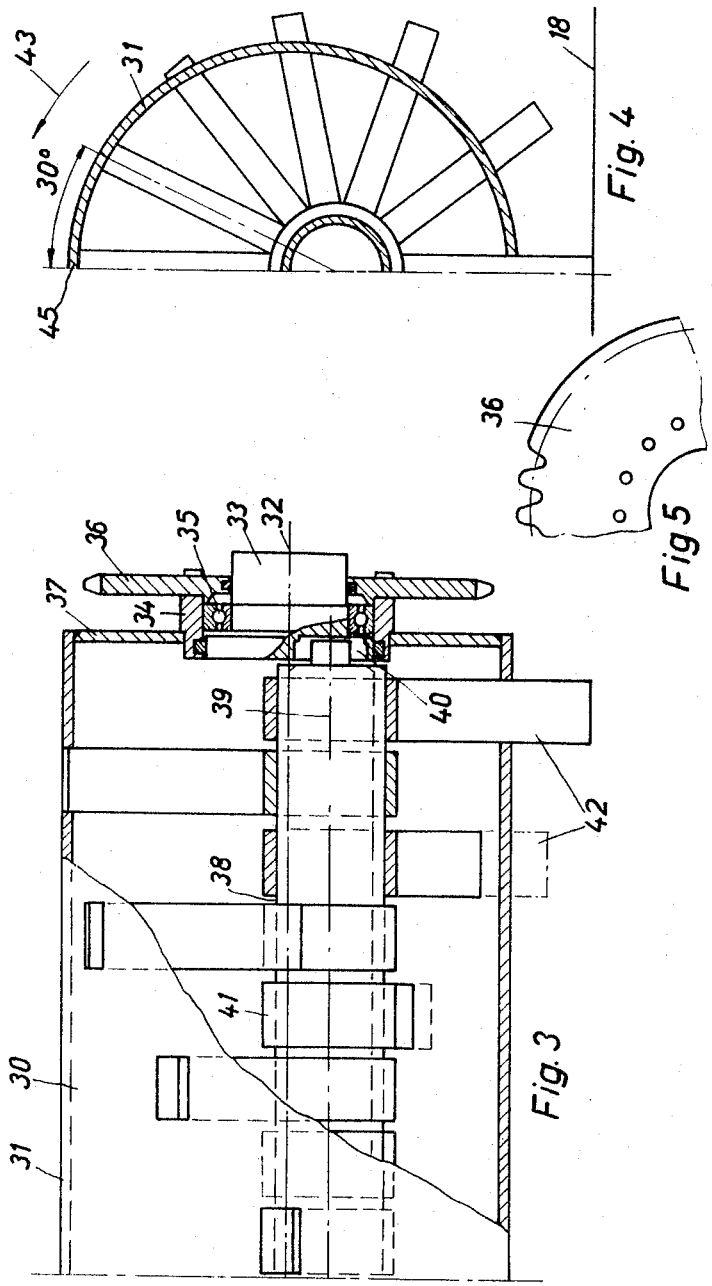
Inventor:
Mikko Jooseppi Terho
Burgess, Ryan & Hicks May 16, 1967 M. J. TERHO 3,319,810
REFUSE VEHICLE
Filed April 8, 1965 4 Sheets-Sheet 4
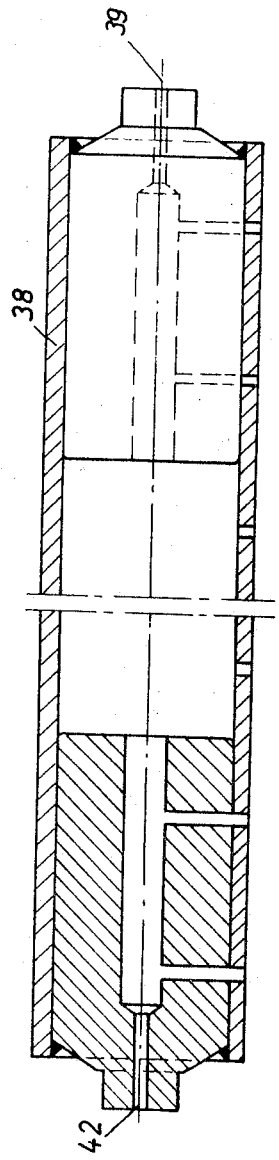
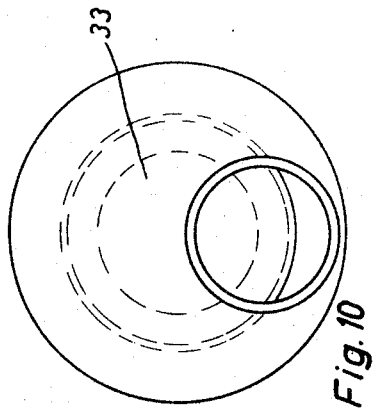
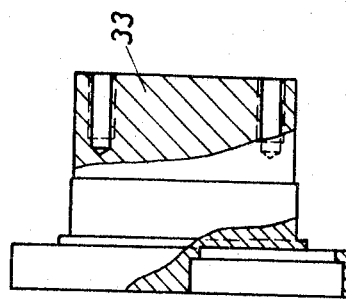
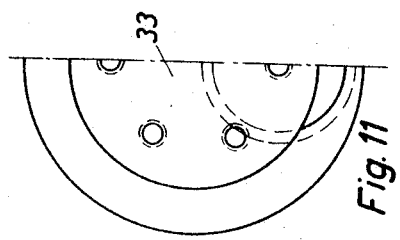
Inventor:
Mikko Jooseppi Terho
Burgess, Ryan & Hicks United States Patent Office 3,319,810
Patented May 16, 1967

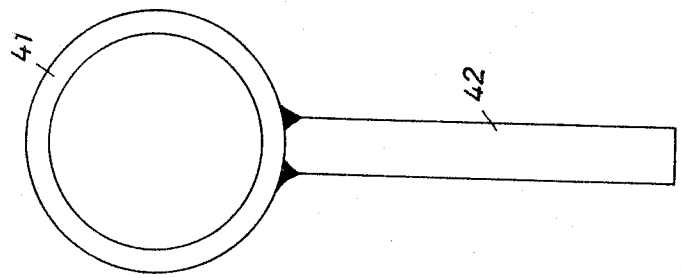
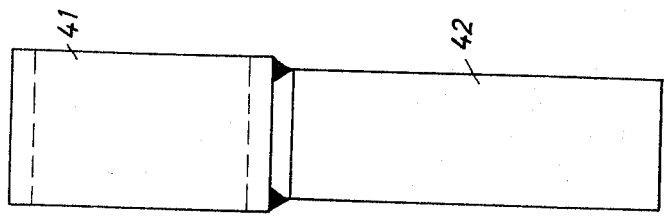
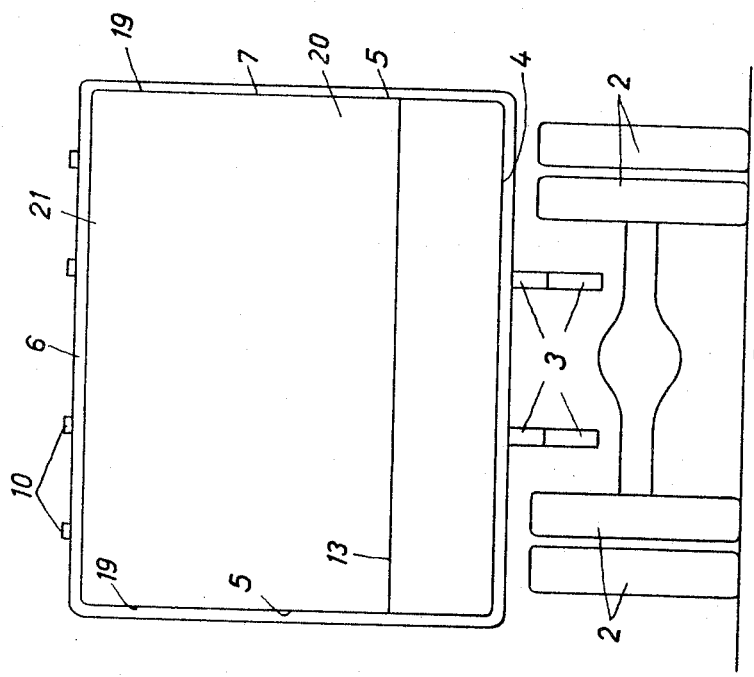

3,319,810
REFUSE VEHICLE
Mikko Jooseppi Terho, Autolava Oy, Raisio, Finland
Filed Apr. 8, 1965, Ser. No. 446,620
5 Claims. (Cl. 214—83)

Nowadays a more economic, faster and more hygienic way of removing refuse is aimed at. To this end endeavours are made to compress the rubbish compactly to a small space in the rubbish tank of the appropriate transport vehicle by means of special devices. Thus the efficiency of transport can be raised considerably over that of the ordinary open cargo vehicle. When loading is automatic a smaller number of men is required in the vehicle and the loading time is shorter. Except saving in costs this form of transportation has the advantage of being hygienic in that odours and the possibility of rubbish flying about is eliminated.

For the compression of rubbish some sort of presses equipped with big spiral screws are used in cargo vehicles nowadays, which presses in the manner of a meat grinder crush and compress the rubbish to a small space in the rubbish tank of the vehicle. Such crushing and compressing presses require comparatively large space and their working efficiency is not very great.

The invention presented here seeks to eleminate these disadvantages. The characteristic features of the invention are presented in the patent claims.

One working example of the invention is illustrated below with reference to the enclosed drawings.

FIG. 2 is a rear view of said vehicle body.

FIG. 3 shows a crushing roller in elevation and partially in section.

FIG. 4 is a partial end view of the before-mentioned crushing roller viewed in the direction of the axis.

FIG. 5 is a partial end view of a detail of FIG. 3.

Figure 1:
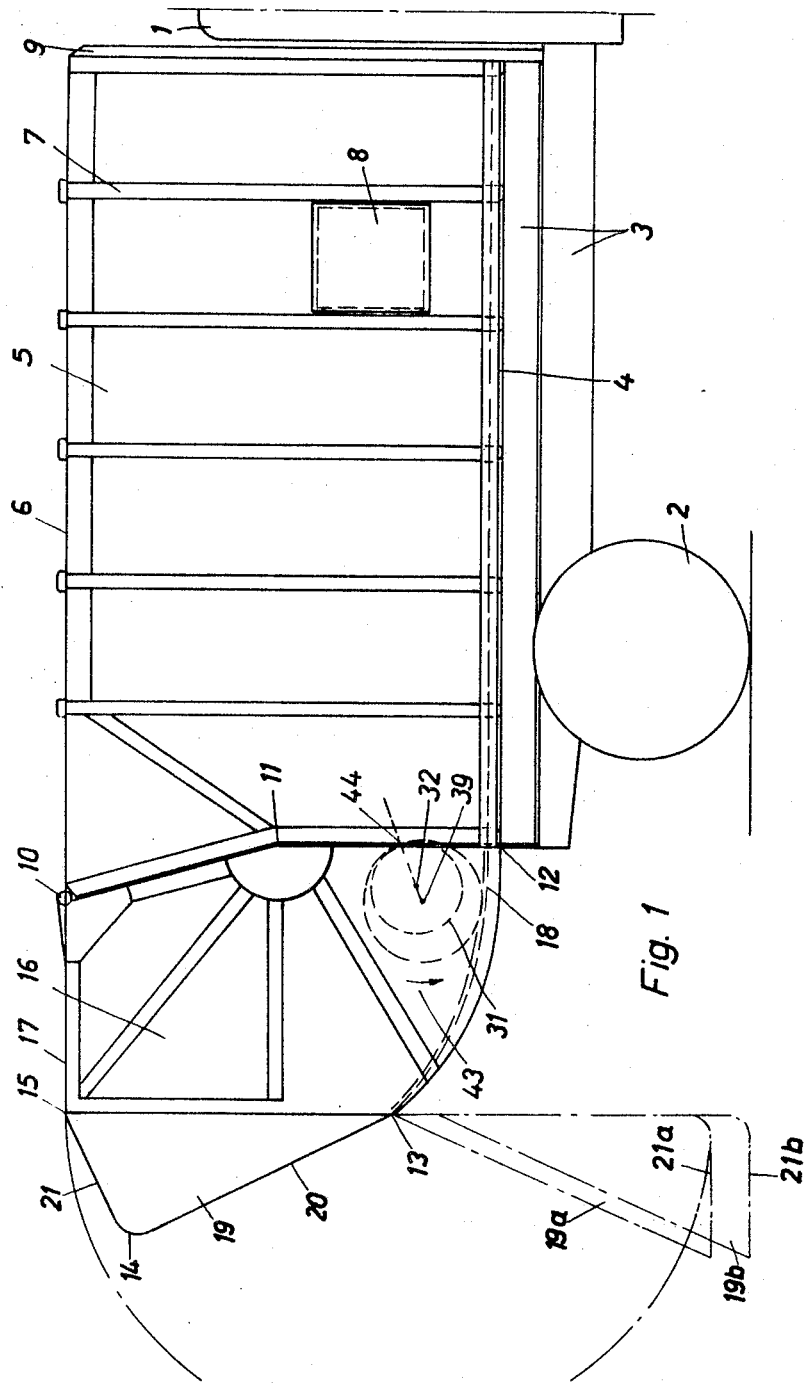
FIG. 1 is a side elevation of the body of a transport vehicle for rubbish according to the invention.

FIG. 6 presents on a larger scale than above in elevation a detail in FIGS. 3 and 4.

FIG. 7 shows the same element as FIG. 6 but viewed in a direction perpendicular to the previous direction.

FIG. 8 is a sectional view of the axle shown in FIG. 3.

FIG. 9 shows the details partially in section of what is shown in FIG. 3.

FIG. 10 presents the same element as in FIG. 9 but from a different side and perpendicularly to the direction of view presented in FIG. 9.

FIG. 11 shows a partial projection of the elements of FIGS. 9 and 10.

In FIG. 1 the numeral 1 designates the rear section wall of the driver's cabin, 2 the rear wheels, 3 side rails and frame bars. The rubbish tank built on the frame construction includes a bottom 4, side walls 5, and a roof 6, all smooth and plane inside and on the outside possibly reinforced with bars 7. The side walls may be provided with an opening 8 through which the operations inside of the tank can be watched by opening the cover. The front wall 9 is stationary, but inside of it there is another wall, not shown in the drawing, which is almost vertical and which can be moved horizontally inside of the tank in the manner of a piston, so that the tank can be emptied through its opened rear end and likewise the rubbish can be compressed inside of the tank if necessary.

The rear wall of the rubbish tank has to be opened. Therefore the rear of the rubbish tank is provided with a so-called swingable rear section, which viewed from the side in FIG. 1 presents a broken line obtained by connecting the points 10, 11, 12, 13, 14 and 15. This swingable rear section can be turned on hinges 10 fixed to the roof by means of a hydraulic mechanism not shown in the drawings. Turning thus takes place around the mathematical axis running perpendicularly to the plane of FIG. 1 through the point 10, at which the swingable rear section at other points is being detached from the rubbish tank itself along planes running through the lines 10, 11, and 12 perpendicularly to the plane of the figure. Thus the rear of the rubbish tank is opened and the rubbish compressed into the tank can be discharged through the open rear by pushing the before-mentioned front wall, moving in the manner of a piston, towards the rear. The swingable rear section when in the lowered position indicated in FIGS. 1 and 2 can be locked to this position by means of locking devices not shown in the drawing.

In the lowered position the side walls 16 of the swingable rear section are extensions in the same plane to the side walls 5 of the rubbish tank and, correspondingly, the plate 6 forming the roof of the swingable rear section is an extension in the same plane to the plate 6 forming the roof of the rubbish tank. The bottom plate 18 of the swingable rear section, which is bending uniformly in rearwardly and upwardly direction to point 13, is extension to the bottom plate 4 of the rubbish tank.

In FIG. 1 the part bounded by the broken line between the points 13, 14 and 15, the so-called dipper, is able to swing rearwardly and downwardly about the axis running through the point 13 perpendicularly to the plane of FIG. 1. At the point 13 hinges are provided for the purpose which are not presented in the drawing. The dipper 19 can thus be swung to the position 19 as indicated by dotted lines in FIG. 1 by means of hydraulic power devices not shown in the drawing. Other hydraulic power means may also be connected to the dipper, by means of which its position of height can be altered from the position 19a shown in the figure, e.g. to the lower position 19b, at which the lower part of the dipper is touching the ground. The side walls 19 of the dipper are extensions to the side walls 16 of the swingable rear section when the dipper is in raised position 19. In addition to the side walls 19 the dipper has a rear wall 20 and a bottom 21. Otherwise it is open so that it can be loaded with rubbish when in position 19a or 19b, or e.g. separate waste containers can be placed on its bottom 21 and tied to the dipper in one way or another. When the dipper then is swung from position 19a to the position 19 the rubbish is dropped out from the dipper, or from the open waste containers attached to it, into the swingable rear section of the rubbish tank, to its bottom 18.

The swingable rear section of the rubbish tank has a front wall (not shown), which consists of a plate perpendicularly to the plane of FIG. 1 connected to the side walls 16 and extending from the front edge 10 of the plate 17 as a plane surface down to the point 11, making at this point a slight bend and continuing as a plane surface towards the front edge 12 of the bottom 18 of the swingable rear section. This front wall, however, does not reach the bottom plate 18 at all points, so that an opening of a suitable size remains between the swingable rear section and the main rubbish tank, through which opening rubbish can be pushed from the rear section into the main rubbish tank by means of devices adapted for the purpose.

The pusher arrangements nowadays in use for crushing and pushing refuse from the swingable rear section into the main rubbish tank of the transport vehicle are usually of the spiral-screw type. The present invention refers to an essentially different type of pusher arrangement which is described below with the aid of the drawings FIGS. 3–10. The pusher arrangement consists of a cylindrical roller 30, with the exterior surface 31 made of very thick plate steel, mounted horizontally in the lower part of the swingable rear section of the rubbish tank in the manner shown in FIG. 1 and pivoted on the axle studs 33, which are rigidly joined to the side walls 16, or to nearby elements. The point 32 presents the mathematical axis of the cylindrical roller. The axle taps 33 are rigidly connected to the side walls 16, or to nearby elements, e.g. by means of screw bolts screwed into holes. The case-like members 34 are connected to the axle studs 33, by means of bearings 35. The chain wheel 36 is joined to the case 34 by means of screw bolts. The end plates 37 of the cylinder are rigidly connected to the case 34 and to the cylindrical surface 31.

An axle 38, the mathematical axis of which is designated by the symbol 39, is pivoted to the axle block 33, eccentrically to the mathematical axis 32. The numeral 40 refers to the bearing. The axle 38 is thus eccentrically supported between the axle studs 33, while the cylindrical roller 30 is pivoted to the axle studs 33, concentrically.

The axle 38 is surrounded by ring-shaped parts 41, which are able to turn about the axle 38 in the manner of a slidebearing. Through the grease channels 42 (FIG. 8) lubricant can be pressed against the inner surface of each ring-shaped part 41.

A rod or arm 42 (FIGS. 3, 6 and 7) of rectangular cross-section and considerable thickness is welded to each ring-shaped part 41, the extreme end of which arms are extending into wide openings in the cylindrical surface 31 of about the same shape as the cross-section of the arm 42, or are sticking through.

The roller 30 is rotated, for instance, by means of a hydraulic motor (not shown) obtaining its power from a pressure medium, which is compressed by the vehicle engine and conducted to the motor through flexible tubes adapted for the purpose. The hydraulic motor is rigidly mounted in the swingable rear section of the rubbish tank at a given distance from the roller 30, so that the rear section including motor and roller can be turned on the hinge 10 in the manner described above.

The hydraulic motor rotates the roller 31 by means of a chain and the corresponding sprocket 36. When the roller is turning around its axis 32 the arms 42 are pulled into the position shown in the top surface of the cylinder 30, as seen in FIGS. 3 and 4, i.e. into the cylindrical surface 31. Due to the eccentric location of the axles 32 and 38, however, the extreme ends of the arms 42 won't be pulled entirely inside of the inner surface of the cylindrical surface 31. In FIGS. 3 and 4 the arms 42 are pushing farthest out from the cylindrical surface at its lowest point.

The openings in the cylinder surface 31 have to be large enough compared to the cross-section of the arms 42, so that the arms 42 in moving back and forth in the openings also are able to deviate a little from the direction of the radius of the cross-section of the cylinder 31, which movement is due to the eccentricity of the axles 32 and 39.

When the cylinder is rotating the ends of the arms 42, located outside of the cylinder surface 31, are pushing rubbish between the cylinder surface 31 and the bottom surface 18 (FIGS. 1 and 4) and further into the main rubbish tank as the cylinder 31 is rotating in the direction of the arrow 43. The horizontal lower edge of the front wall of the swingable rear section of the rubbish tank may reach as far as to the point 44 according to FIG. 1, and to the point 45 according to FIG. 4. The rotating roller 31 is thus preventing rubbish from being drawn back from the rubbish tank to the swingable rear section. While rubbish is being pushed under the roller this is crushing the material with great force against the bottom 18.

According to the FIGS. 3 and 4 the axles 32 and 39 are situated on top of each other in the same vertical plane. Thus the horizontal lower edge of the front wall of the swingable rear section must be tangent to the roller at its highest point. According to FIG. 1, however, the axles 32 and 39 are not situated above each other in the same vertical plane but diagonally above each other, on account of which that point 44 where the arms 42 are drawn inside of the outer surface of the roller is not situated at the highest point of the roller but at a point somewhat away from it, at which latter point, or close to it, the lower edge of the front wall of the swingable rear section is ending up.

The relative location of the axles 32 and 39 in FIG. 1 may be advantageous in certain cases, because then the arms 42 are in their outermost position already a little before their lowest point, at which the arms are well able to force rubbish to the lowest point of the roller.

The axle studs 33 may also be rigidly connected within the walls 6 to plates situated near these walls preventing the axle studs 33 from rotating, but which plates including axle studs are able to move in upwardly and downwardly direction along suitable guides. Thus, if some very large body of waste is entering under the roller and cannot be crushed to parts small enough to fit between the roller 30 and the bottom 18, the roller is able to rise so much that the waste bodies referred to have room to move under the roller into the rubbish tank. After this the roller may drop back to its original position shown in FIGS. 1 and 4. A spring or springs may also be used which are striving to force the roller to its lower position, thus increasing the tendency of the roller to return to its lower position due to its own weight. As guides for guiding the movement of the beforementioned plates, including the axle studs 33 rigidly attached, vertically or almost vertically, one may use e.g. rails or grooves. The axle studs may also be rigidly attached to the ends of such arms where the opposite ends are hinged to the horizontal axis through point 13, running perpendicularly to the plane of FIG. 1, in such a way that the arms mentioned are able to a certain extent to turn radially about the axis.

Using suitable constructions the hydraulic motor is connected to the axle studs 33 in such a manner that the hydraulic motor is accompanying the roller in its movements up and down, while rotating the roller continuously.

In order to decrease the danger of plugging up, i.e., to bring about a good crushing effect, it has appeared advantageous in certain cases that the beforementioned arms 42 are situated on the common axle 38 in such a way, that of two adjacent arms the second arm is turned 180° away from the first arm, looking in the direction of the axle, and the third arm is at 30° angle to the first arm, the fourth arm again being at 180° angle to the third and at 30° angle the second arm and so on, so that the extreme ends of the arms are situated on two similar screw-shaped lines.

Running tests have shown that the roller, according to the invention, has been able to crush easily thick boards and battens, furniture to be scrapped, likewise bicycles, iron beds, etc., stamping all these bodies to a small space inside of the rubbish tank.

When the rubbish tank has become filled with crushed and compactly compressed rubbish, and this cargo has been driven to the dumping ground, it is only necessary to raise the swingable rear section of the motor vehicle on the hinges 10 by means of the hydraulic power means, at which the rear end of the rubbish tank opens and the rubbish can be pushed out from the tank by forcing the inner second front wall of the rubbish tank backwards inside of the tank in the manner of a piston.

The invention is not restricted only to the working example described above and illustrated in the drawings, but it can be varied in many ways within the scope of the patent claims following below.

I claim:

1. In a refuse truck having a closed body with an opening therein having a floor, a packing and crushing device in the opening and located above the floor of said opening to cooperate with said floor to crush refuse and move it into the body of said truck, said packing and crushing device consisting of a hollow rotatable cylindrical roller mounted on axle studs, means for rotating said roller, an axle whose axis remains stationary in relation to said studs mounted eccentrically but parallel to the axis of said roller and inside thereof, slidable arms rotatably mounted side by side on said axle and extending at right angles thereto through openings in the periphery of said roller so that upon the rotation of said roller said arms move in and out through their respective openings in said roller surface.

2. Device as in claim 1, characterized in that the above-mentioned mutually eccentric axles are situated above each other vertically.

3. Device as in claim 1, characterized in that the mutually eccentric axles mentioned are not situated in the same vertical plane above each other, but otherwise eccentrically.

4. Device as in claim 1, characterized in that the cross-sections of the arms are rectangular, at which the longer sides are parallel to the axles mentioned.

5. Device as in claim 1, characterized in that the arms mentioned are situated on the common axle in such a manner that the second of two adjacent arms is turned 180° away from the first arm looking in the direction of the axle, while the third arm is forming a 30° angle with the first arm, the fourth arm again being at 180° angle to the third forming a 30° angle with the second arm and so on, so that the extreme ends are located on two similar screw lines.

References Cited by the Examiner

UNITED STATES PATENTS

| 947,013 | 1/1910 | Dowd. | |
| 3,092,269 | 6/1963 | Brown et al. | 214—83.3 |

FOREIGN PATENTS

| 792,162 | 10/1935 | France. |
| 825,873 | 12/1937 | France. |

GERALD M. FORLENZA, *Primary Examiner.*

ALBERT J. MAKAY, *Examiner.*